United States Patent Office 3,418,860
Patented Dec. 31, 1968

3,418,860
SHIFT MECHANISM FOR SPINDLE PRESS
Harald Hany and Volker Stille, Kassel-Wilhelmshohe, Germany, assignors to Firma Franz Berrenberg, a corporation of Germany
Filed Sept. 23, 1966, Ser. No. 581,616
Claims priority, application Germany, Oct. 15, 1965, B 84,118; Oct. 16, 1965, B 84,132
10 Claims. (Cl. 74—199)

ABSTRACT OF THE DISCLOSURE

Spindle press with a driven disk flanked by a pair of driving disks on a common shaft which is axially shiftable to bring either driving disk into frictional engagement with the driven disk, the axial shifting being effected by a pneumatic or hydraulic mechanism including a pair of primary pistons and a pair of secondary pistons, the latter pistons being under constant fluid pressure for maintaining the driving disks disengaged from the driven disk unless overriding pressure is applied to one or the other primary piston.

---

Our present invention relates to a spindle press of the type wherein a spindle, rotatably mounted (usually in vertical position) on a press frame, can be reversibly driven with the aid of a pair of driving disks mounted on a transverse (usually horizontal) shaft for alternate frictional engagement of a driven disk rigid with the spindle, e.g. as described in our copending application Ser. No. 550,208, filed May 16, 1966.

The shifting of the driving disks into alternate engagement with the driven disk has heretofore been carried out with the aid of relatively complex linkages which were subject to considerable wear and, because of their inherent inertia, unsuited for high-speed operation with rapid reciprocation of the spindle.

The general object of our present invention is to provide a shifting mechanism for a press of this description which avoids the aforestated drawbacks and can be quickly actuated for moving the two driving disks with their shaft into either of two limiting positions, i.e. positions in which one or the other driving disk frictionally entrains the driven disk, with only a minimum of parts disposed in a compact assembly near the spindle head.

A more particular object of this invention is to provide a shifting mechanism having means for automatically and positively arresting the shiftable unit in an intermediate position in whch neither driving disk engages the driven disk so that, in the absence of a command for a displacement of the unit into one of its limiting positions, the mechanism will prevent any accidental and untimely rotation of the spindle in either direction.

It is also an object of our invention to provide a construction for such a shiftable unit, consisting of an axially movable shaft with a pair of driving disks, which allows the unhindered movement of an associated driven disk from a position near the peripheries of the driving disks to the immediate vicinity of the shaft.

In accordance with our present invention, a mechanism for selectively displacing such a shiftable unit between its two limiting positions, by way of an intermediate position of disengagement, includes a pair of first or principal pistons in engagement with opposite shaft ends and a pair of second or auxiliary pistons arranged to exert pressure upon these opposite shaft ends, the spindle support constituted by the press frame forming abutments disposed adjacent the two shaft ends in the path of the auxiliary pistons for arresting the latter in the aforementioned intermediate position of the unit; these auxiliary pistons are hydraulically or pneumatically biased under a constant fluid pressure which is weaker than an overriding fluid pressure that can be selectively applied by a hydraulic or pneumatic controller to one or the other of the principal pistons for shifting the unit into a corresponding limiting position in which the spindle is rotatably entrained.

It is convenient to obtain the biasing pressure and the overriding control pressure from a common source of hydraulic or pneumatic fluid, in which case the principal pistons should have a larger effective area than the auxiliary pistons in order to generate an overriding force. Advantageously, the principal pistons are connected with the associated shaft ends through the intermediary of an antifriction coupling, such as a radial ball bearing, enabling free rotation of the shaft relative to the pistons.

A particularly compact arrangement is achieved if, pursuant to a more specific feature of our invention, the principal pistons are interposed between the shaft ends and the auxiliary pistons so that the latter act upon the shiftable unit through the intermediary of the principal pistons as long as the latter pistons are not themselves under direct fluid pressure.

A further feature of our invention resides in a mounting of the driving disks on their shaft in such a manner that no protruding parts encroach upon the space between the two driving disks which is reserved for a displacement of the driven disk in radial direction of the shaft. For this purpose we provide the shaft with a pair of threaded portions adjacent its piston-engaging ends, these portions having screwed onto them a pair of collars which flank the two driving disks and are respectively fastened thereto. Advantageously, the disks may also be screwed onto the threaded shaft portions whose threads thus serve as abutments against which the disks and collars can be adjustably stressed with the aid of clamping bolts or the like, this arrangement enabling immobilization of the driving disks on the shaft in different positions whereby the axial separation of these disks may be conveniently varied.

The invention will be described in greater detail with reference to the accompanying drawing in which.

Figure 1:
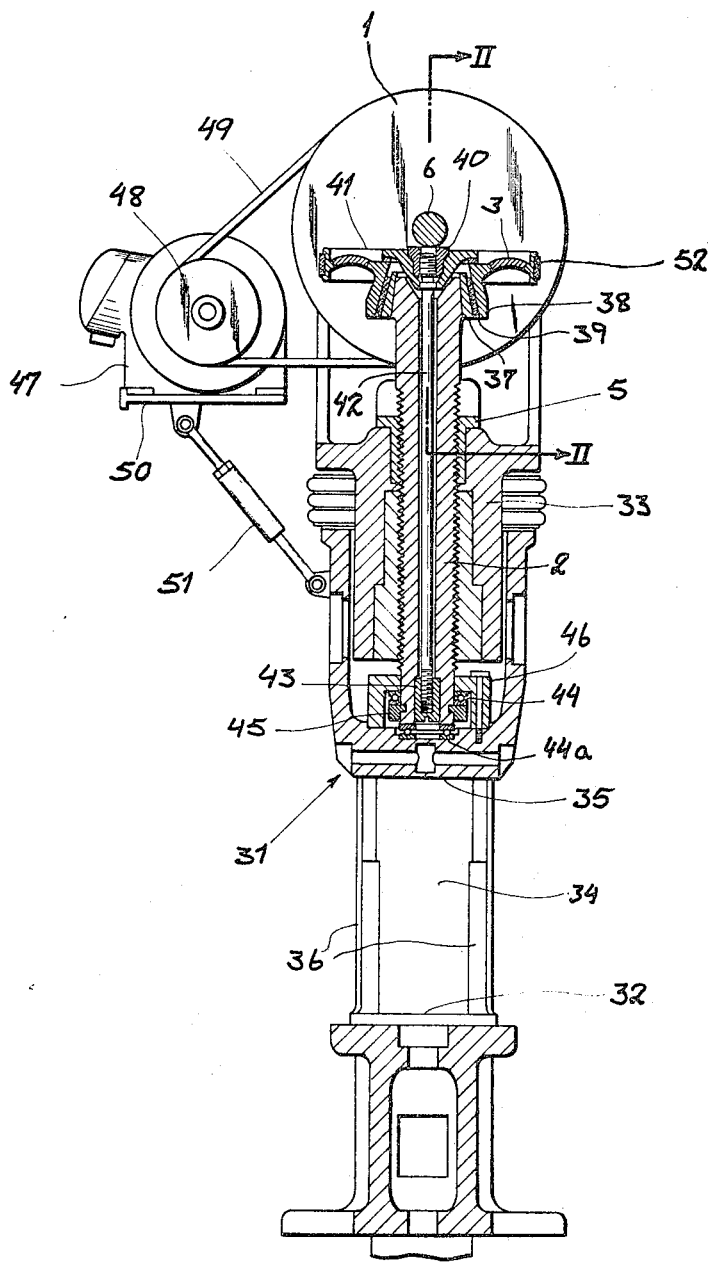
FIG. 1 is a side-elevational view, partly in section, of a press embodying our present improvement.

The spindle press shown in the drawing comprises a press frame 31 having a bed 32 underneath a beam 33 wherein a spindle 2 is vertically slidable. The beam 33 is rigid with a pair of lateral uprights 34 (only one shown) of the press frame and supports a nut 5 threadedly engaging the spindle 2, this nut being nonrotatably mounted on the beam so that the spindle reciprocates vertically upon being rotated in one direction or the other. The lower end of the spindle is coupled with a ram 35 which is slidably but nonrotatably guided by a pair of vertical rods 36 extending alongside the uprights 34.

The head 37 of spindle 2 has a frustoconical peripheral surface fitting into a complementary bore of a hub 38 forming part of a driven disk 3 which is secured to the spindle, with interposition of a friction layer 39, by a nut 40 bearing upon the disk 3 through the intermediary of a generally cup-shaped pressure element 41. Nut 40 threadedly grips the upper extremity of a vertical tension rod 42 which traverses the spindle 2 in axial direction and whose lower end is threadedly engaged by a nipple 43 bearing upon an internal shoulder of the spindle bore for enabling adjustment of the stress exerted upon nut 40 and element 41. An antifriction bearing 44 is interposed between a flange 45 at the lower spindle end and a yoke 46 rigidly connected with the ram 35; a similar bearing 44a separates the spindle end from the ram proper.

Figure 2:
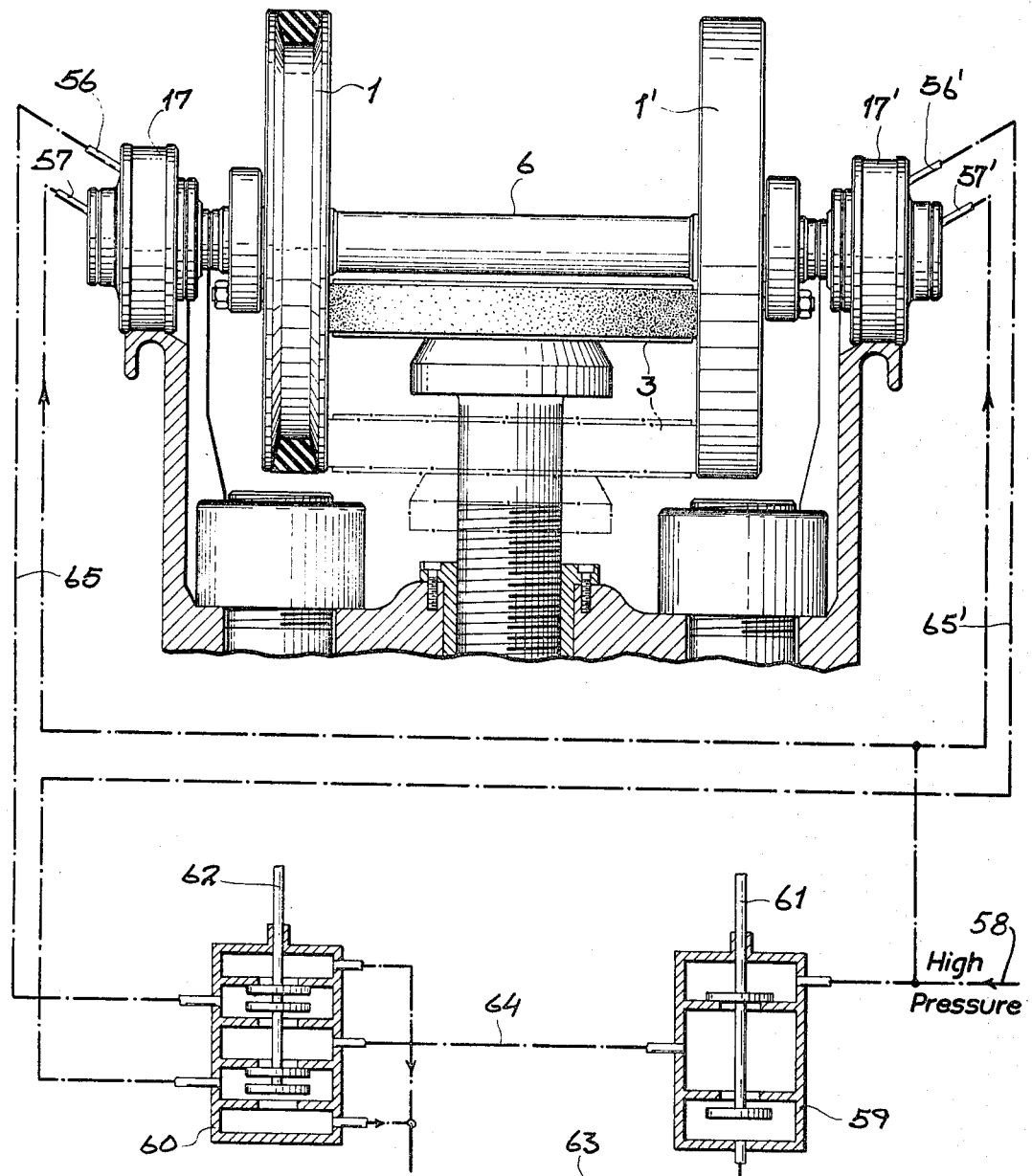
FIG. 2 is a front-elevational view of the top of the press, drawn to a larger scale and taken partly in section on the line II—II of FIG. 1.

Motion is imparted to the disk 3 by its peripheral engagement with either of two driving disks 1, 1' fixed to a shaft 6 which is journaled, in a manner more fully described hereinafter, in housings 17, 17' formed by extensions 7, 7' of the press frame 31. This frame also supports a drive motor 47 which is linked via a pulley 48 and a belt 49 with one of the driving disks, here the disk 1, for rotating the unit 1, 1', 6. Motor 47 is mounted on a platform 50 which can be swung away from the frame 31 by a hydraulic jack 51 to tension the belt. It will be apparent that the speed of rotation of driven disk 3 increases as it descends, together with spindle 2, toward its lower dead-center position (dot-dash lines, FIG. 2) near the level of the nadirs of disk 1, 1' in which it contacts the latter, through a peripheral friction layer 52, along a larger radius than in its elevated starting position illustrated in full lines.

The details of the mounting of disk 3 on spindle 2, broadly described above, are specifically claimed in our aforementioned copending application Ser. No. 550,208.

Figure 3:
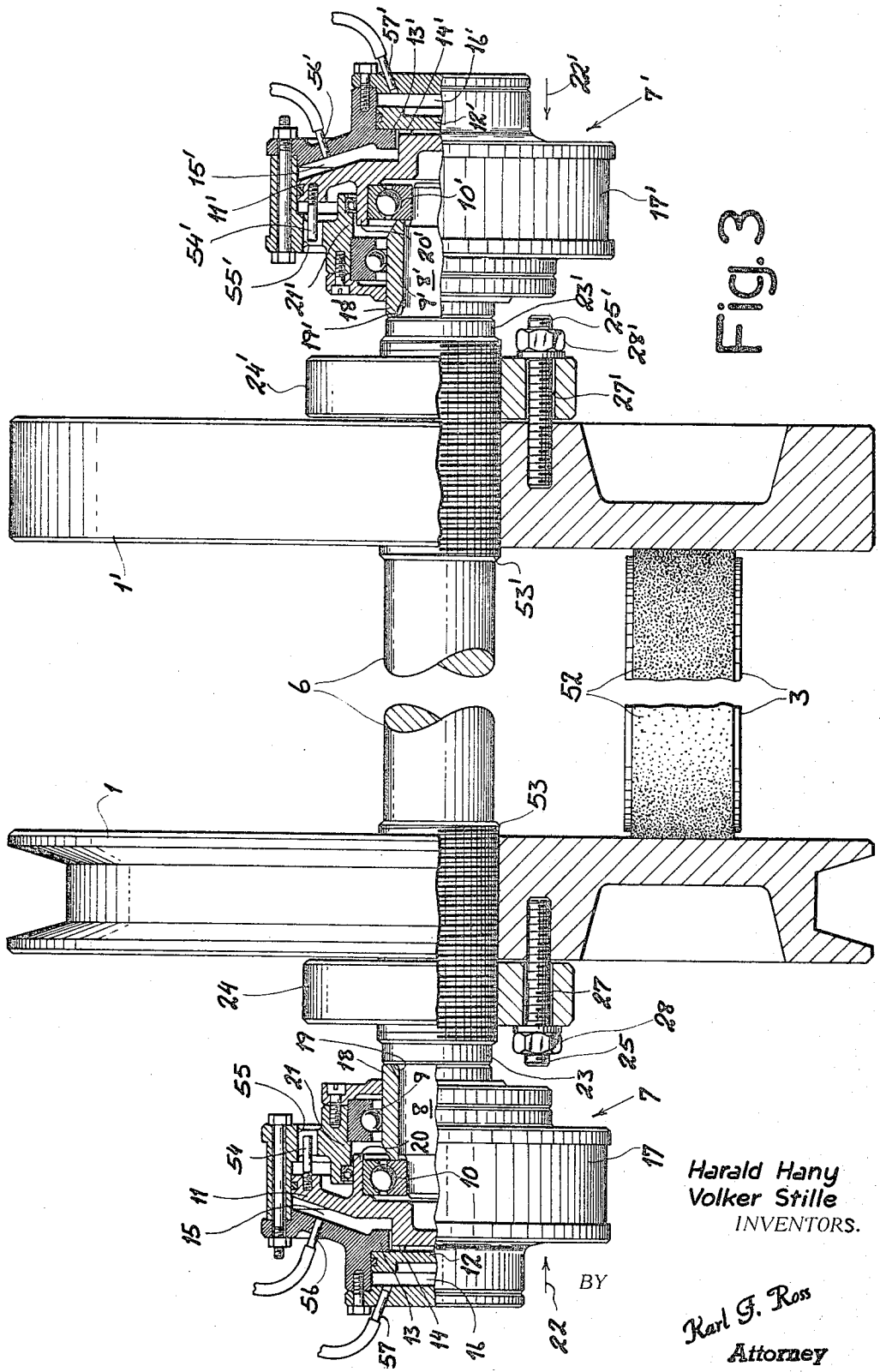
FIG. 3 is a view similar to FIG. 2, with parts broken away, drawn to a still larger scale.

Reference will now be made more particularly to FIG. 3 for a description of a mechanism which, in accordance with our present invention, tends to maintain the unit 1, 1', 6 centered with reference to the axis of spindle 2 so that disk 3 is disengaged unless an associated hydraulic or pneumatic control system actuates this mechanism to shift that unit into a position of engagement of either of its driving disks with disk 3.

Shaft 6 has ends 8, 8' separated from its main body by threaded portions 53, 53' which carry the internally threaded hubs of disks 1, 1'. The latter are adjustably fixed in their positions by adjoining collars 24, 24', also threaded onto the shaft portions 53, 53', against which they are tensioned by sets of mounting bolts 25, 25' (only one of each shown) that are screwed into the disk hubs and freely pass through bores 27, 27' in collars 24, 24', these collars being under pressure from nuts 28, 28' engaging the outwardly projecting extremities of the bolts. This arrangement permits unhindered movement of disk 3 into its top position close to shaft 6 even if the disks 1, 1' are as close together as is possible without entrainment of disk 3 in the illustrated intermediate position. Maintenance of this minimum disk spacing, through readjustment whenever this becomes necessary by surface wear, insures a prompt response of the shiftable unit 1, 1', 6 to a command of its actuator moving it into either of its engaged positions.

The elements of the fluid-actuated control mechanism about to be described are identically duplicated at opposite ends of shaft 6 so that a description of the parts associated with the left-hand shaft extremity 8 will suffice; corresponding elements on the right-hand side have been designated by the same reference numerals primed.

Shaft end 8 is surrounded with tight fit by a sleeve 18 which rests against a shoulder 19 and is rotatably and axially slidably supported in housing 17 through a journal bearing 9. The outer race of bearing 9 is held in a flange 21 of housing 17 which slidably receives a piston 11 coupled with shaft 6 for bidirectional axial entrainment through a ball bearing 10 whose inner race is press-fitted onto the shaft end 8 while its outer race is held with similar fit in a flange 20 of piston 11. A locator pin 54 on piston 11 traverses a bore 55 in flange 21. Housing 17 forms a cylinder space 15 around the piston 11 which is separated by a set of spacers 14 (only one shown) from another piston 12 of smaller cross-sectional area movable within a cylinder space 16 also defined by housing 17. An annular abutment 13 limits the inward displacement of piston 12 in the direction of arrow 22. Cylinder spaces 15 and 16 communicate via respective ports 56, 57 with a source of pressure fluid, shown in FIG. 2 as a supply conduit 58, through the intermediary of two tandem-connected valves 59, 60 having manually or otherwise actuable valve bodies 61, 62. Ports 57, 57' are directly connected to line 58 so as to be under constant fluid pressure urging the pistons 12, 12' toward the abutments 13, 13'. In the illustrated position of valve body 61, valve 59 cuts off the fluid flow to ports 56, 56', irrespectively of the position of valve body 62, so that cylinder spaces 15 and 15' are vented to a low-pressure line 63 leading to a sump or reservoir. Under these circumstances the two outer pistons 12, 12' are in contact with the abutments 13, 13' and, by acting upon the shaft 6 through the intermediary of spacers 14, 14' and inner pistons 11, 11', maintain the shiftable unit centered in its intermediary position in which disk 3 stands clear of disks 1, 1'.

When it is desired to impart motion to spindle 2, valve body 61 is shifted to unblock the flow of high-pressure fluid to a line 64 interconnecting the two valves 59, 60. In the illustrated position of valve body 62, this fluid enters a conduit 65 leading to port 56 while port 56' remains connected to the sump through its feed line 65'. In view of the larger effective area of pistons 11, 11' as, compared with pistons 12, 12', the fluid pressure acting upon piston 11 overrides the opposing biasing pressure of piston 12' so that the unit 1, 1', 6 shifts to the right and disk 1 engages the disk 3 so as rotatively to entrain same. If, now, the valve body 62 is moved into its alternate position, high-pressure fluid from line 64 reaches the port 56' through conduit 65' and shifts the driving unit into its opposite limiting position, i.e. to the left in FIGS. 2 and 3, to bring disk 1' into contact with disk 3 whereby the rotation and vertical movement of spindle 2 are reversed. Restoration of valve body 59 to its illustrated position returns the system to its neutral state.

We claim:
1. A spindle press comprising a support; a spindle rotatably journaled on said support; a driven disk coupled with said spindle for joint rotation about the spindle axis; a shaft transverse to said axis slidably and rotatably mounted on said support; a pair of driving disks on said shaft forming therewith a unit movable relatively to said support in axial direction of said shaft between two limiting positions in which said driven disk is in frictonal engagement wth a respective driving disk for entrainment thereby; and mechanism for selectively displacing said unit between said limiting positions and an intermediate position in which said driven disk is disengaged from both said driving disks, said mechanism including a pair of first pistons in engagement with opposite ends of said shaft, a pair of second pistons arranged to exert pressure bearing upon said oposite ends, abutment means disposed on said support adjacent said opposite ends in the path of said second pistons for arresting same in said intermediate position of said unit, control means for selectively applying fluid pressure to either of said first pistons to displace said unit into a respective limiting position, and biasing means for continuously applying fluid pressure weaker than that of said control means to said second pistons for maintaining said unit in said intermediate position in the absence of an overriding fluid pressure on either of said first pistons.

2. A press as defined in claim 1 wherein said first pistons have a larger effective area than said second pistons, said control means and biasing means comprising a common source of pressure fluid.

3. A press as defined in claim 1 wherein said opposite ends of said shaft extend beyond said driving disks and are provided with antifriction coupling means connecting same to said first pistons with freedom of relative rotation.

4. A press as defined in claim 3 wherein said antifriction coupling means are radial ball bearings including outer races rigid with said first pistons and inner races rigid with said ends.

5. A press as defined in claim 3 wherein said first pistons are interposed between said opposite ends and said second pistons for transmitting the pressure of the latter to said shaft.

6. A press as defined in claim 3 wherein said support has a pair of annular extensions surrounding said opposite ends and forming cylinders about said first and second pistons for the application of pressure fluid thereto.

7. A press as defined in claim 6, further comprising a pair of journal bearings in said extensions supporting said opposite ends at locations between said driving disks and said coupling means.

8. A press as defined in claim 6 wherein the pistons of one pair are provided with spacers extending toward the pistons of the other pair for engagement thereby with maintenance of a clearance therebetween for said pressure fluid.

9. A press as defined in claim 1 wherein said shaft is provided with a pair of threaded portions adjacent said opposite ends, further comprising a pair of collars screwed onto said portions adjacent the outer surfaces of said driving disks and fastening means securing said driving disks to the respective collars.

10. A press as defined in claim 9 wherein said driving disks have internally threaded hubs screwed onto said threaded portions, said fastening means comprising bolts extending outwardly from said driving disks through bores in said collars and nuts in engagement with said bolts bearing upon the outer surfaces of said collars.

References Cited

UNITED STATES PATENTS

| 1,449,849 | 3/1923 | Zeh | 74—194 |
| 1,707,001 | 3/1929 | Georg | 74—194 |
| 2,770,862 | 11/1956 | Miller | 100—289 XR |
| 3,044,138 | 7/1962 | Lesnett et al. | 100—289 XR |

FOREIGN PATENTS

| 41,897 | 1965 | Germany. |
| 839,572 | 6/1960 | Great Britain. |
| 1,263,550 | 5/1961 | France. |

C. J. HUSAR, *Primary Examiner.*

U.S. Cl. X.R.

100—289